United States Patent [19]

Bracken et al.

[11] Patent Number: 4,485,898
[45] Date of Patent: Dec. 4, 1984

[54] BRAKE PAD FOR REDUCING BRAKE NOISE

[75] Inventors: William J. Bracken, Livonia; Johnny K. Sakioka, Jr., Belleville, both of Mich.

[73] Assignee: Ford Motor Company, Dearborn, Mich.

[21] Appl. No.: 444,242

[22] PCT Filed: Sep. 30, 1982

[86] PCT No.: PCT/US82/01367

§ 371 Date: Sep. 30, 1982

§ 102(e) Date: Sep. 30, 1982

[87] PCT Pub. No.: WO84/01412

PCT Pub. Date: Apr. 12, 1984

[51] Int. Cl.³ .............................................. F16D 69/02
[52] U.S. Cl. .............................. 188/250 B; 188/73.1; 188/26 AB
[58] Field of Search ............. 188/73.1, 250 B, 250 G, 188/251 A, 251 M, 255, 257, 264 B; 192/113 B

[56] References Cited

U.S. PATENT DOCUMENTS

| 480,982 | 8/1892 | Wohlfarth | 188/264 B |
| 995,067 | 6/1911 | Jones | |
| 1,239,448 | 9/1917 | Armburst | |
| 1,844,461 | 2/1932 | Chase | 188/264 B |
| 2,976,957 | 3/1961 | Brooks | 188/78 |
| 3,378,115 | 4/1968 | Stephens | 188/218 A |
| 3,891,398 | 6/1975 | Odier | 188/73.1 X |
| 4,200,173 | 4/1980 | Evans et al. | 188/250 B X |
| 4,315,563 | 2/1982 | Hayashi et al. | 188/73.1 |

FOREIGN PATENT DOCUMENTS

| 2427757 | 12/1975 | Fed. Rep. of Germany . | |
| 272795 | 3/1930 | Italy . | |
| 272723 | 1/1934 | Italy . | |
| 362867 | 1/1932 | United Kingdom . | |
| 624614 | 6/1949 | United Kingdom | 188/264 B |
| 656324 | 8/1951 | United Kingdom | 188/264 B |
| 785615 | 10/1957 | United Kingdom | 188/264 B |

Primary Examiner—Duane A. Reger
Attorney, Agent, or Firm—Peter D. McDermott; Roger L. May

[57] ABSTRACT

A brake pad 58 (see FIG. 6) has a lining with particulate graphite material embedded therein. A leading portion 62 of the brake lining has a higher concentration of the graphite particles embeded therein than a remaining portion 64 of the lining 60. A brake rotor is lubricated simultaneously as it contacts the leading edge 65 of the brake lining to maximize the effectiveness of the lubricant at the leading edge 65 of the brake lining.

10 Claims, 7 Drawing Figures

4,485,898

BRAKE PAD FOR REDUCING BRAKE NOISE

TECHNICAL FIELD

This invention relates to brake assemblies and, more particularly, to a brake pad construction for reducing brake noise.

BACKGROUND DISCLOSURE INFORMATION

Brakes are an essential part of a motor vehicle. Brakes, whether they be disc brakes or drum brakes, often produce noise. The noise can vary in nature and has been called brake squeal, creep and groan, pinch-out squeal, and wire brush. This brake noise is undesirable because it interferes with the quiet ride of the motor vehicle. In addition, the operator may believe that the brakes are not operating in a proper manner because of the noise. The operator may thereby feel insecure about driving the vehicle.

Many efforts have been made to reduce the noise of brakes. The brake pads have often been made with quieter materials. In addition, efforts have been made to clean the drum or rotor from particulates which may produce noise. It is also known that slight lubrication of the rotating member can reduce noise without diminishing the braking effect of the brakes.

Lubricants have been incorporated in the brake pad itself. Graphite particles have been dispersed in the brake lining material up to a 10% concentration. Lubricating discs or rectangular shaped inserts have been embedded within the brake lining. Because the lubricating particles or inserts were embeded within the brake lining, the lubricant was often wiped off or otherwise dispersed from the lubricated rotor section before the lubricated rotor section engaged the leading edge of the brake pad. Effective lubrication of the rotor to reduce brake noise in this fashion would necessitate increasing the amount of lubricant concentration throughout the entire pad. On the other hand, diminished braking ability of the pads limits the increase of lubricant concentration.

It has been determined that most brake noise emanates from a leading portion or leading contact edge of the brake pad. It is, therefore, desirable to put lubricant on the rotating member in a fashion that would prevent the lubricant from being wiped off or otherwise dispersed before that lubricated section of the rotor engages the leading edge of the brake lining. It is desired to have the concentration of lubricant vary throughout the brake pad such that the leading edge of the brake lining engages the lubricant simultaneous with or immediately after the lubricant is applied to the rotor.

SUMMARY OF THE INVENTION

In accordance with the invention, a brake pad has a friction lining commonly called a brake lining for frictionally engaging a rotatable member, for example, a rotor. The pad also has a lubricating section positioned to apply lubricant to the rotor in a manner that the lubricated rotor section engages the leading contact edge of the brake lining before engaging any other section of the brake pad. Preferably, the lubricating section is integral with the leading contact edge of the brake lining. Alternatively, the lubricating section is positioned immediately forward of the leading contact edge of the brake lining.

In one embodiment, the lubricant consists of particulate graphite uniformly distributed throughout a leading portion of a one-piece frictional lining of the brake pad. The density of the graphite particulates is higher in the leading portion than in the remaining portion of the frictional lining.

In another embodiment, the lubricant comprises a graphite material bonded to a brake lining such that the leading contact edge of the brake lining is immediately behind the graphite material.

An actuator such as a caliper, when actuated, moves the brake pads into frictional engagement with the rotor. As the rotor rotates, one section of the rotor at a time abuts the lubricating section and is lubricated thereby. The rotor section is simultaneously in engagement with the leading contact edge of the brake lining or moves a small distance to then become engaged with the leading contact edge of the brake lining.

In this fashion, lubricant is efficiently transferred to the rotor and effectively passed under the leading contact edge of the brake lining before the lubricant is dispersed or wiped off. In this fashion, the lubricant is most effective in reducing the brake noise caused by a leading contact edge of the brake lining.

In other terms, the invention relates to a brake assembly that includes a brake and a rotatable member and an actuator to abut the brake lining of the pad to the member. The brake assembly has a section of the rotatable member lubricated either before or simultaneously with engagement of the rotatable member secion with the leading contact edge of the brake lining of the brake pad.

A BRIEF DESCRIPTION OF THE DRAWINGS

Reference now will be made to the accompanying drawings in which.

DETAILED DESCRIPTION OF THE PREFERRED EMBODIMENTS

Figure 1:
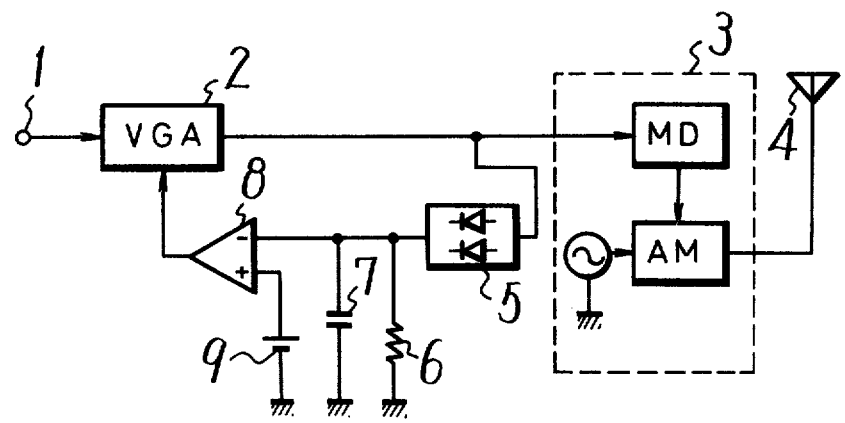
FIG. 1 is a perspective view of a disc brake assembly incorporating brake pads according to one embodiment of the invention.

Referring to FIG. 1, a disc brake assembly 10 includes a rotor 12, a stationary torque member 14 and a caliper 16. The caliper 16 is mounted to the torque member 14 and straddles the rotor 12. The caliper 16 has mounted thereto two brake pads 18 and 19 that are frictionally engagable to each side of the rotor.

Figure 2:
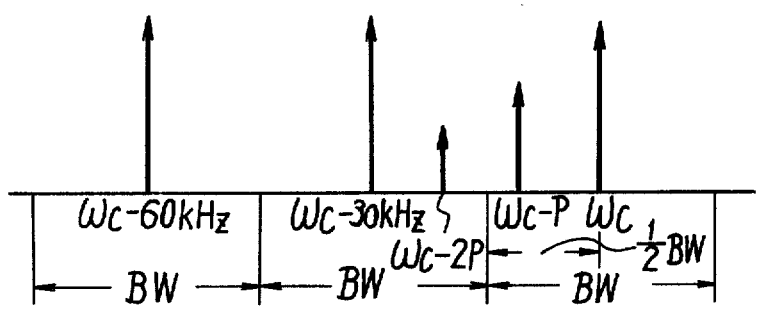
FIG. 2 is a perspective view of one embodiment of the brake pad.
Figure 3:
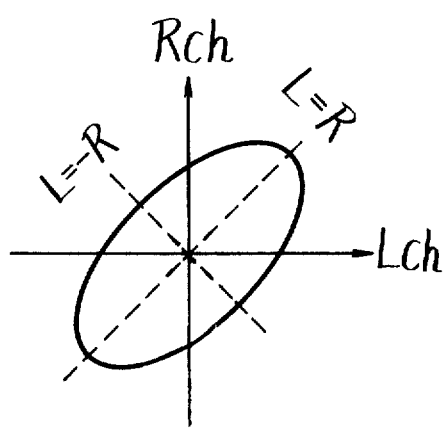
FIG. 3 is a plan view of the brake pad shown in FIG. 2.

Brake pads 18 and 19 are substantively identical. One is a mirror image of the other and, hence, further reference will only be made to one brake pad 18 unless otherwise indicated. Brake pad 18, as shown in FIGS. 2 and 3, has a backing plate 20 attached to a lining 22. The lining 22 has a braking surface 24 defined in a braking plane 26 as shown in FIG. 3. The lining 22 has a leading contact edge 28, a graphite insert 30, and a chamfered section 32. A graphite insert 30 is bonded to lining 22 adjacent the leading contact edge 28. The graphite insert 30 extends the full width of lining 22. A chamfered section 32 is bonded to the front side of the graphite insert 30. The chamfered section 32 tapers forwardly and away from the braking plane 26. Both the lining 22 and chamfered section 32 are made from a friction material of conventional nature. One suitable material could be TP1353M manufactured by Thiokol.

When the brake is actuated, the caliper 16 moves the pads 18 into engagement with the rotor 12. The rotor surface section 33 rotating into the brake pad will first contact the graphite insert 30 and be lubricated by the graphite rubbing off onto the rotor. The rotor surface section 33 then passes under the leading contact edge 28 of lining 22 immediately after being lubricated by the graphite insert. The rotor then passes under the remainder of surface 24 of the brake lining 22 which effectively brakes the rotor.

Figure 4:
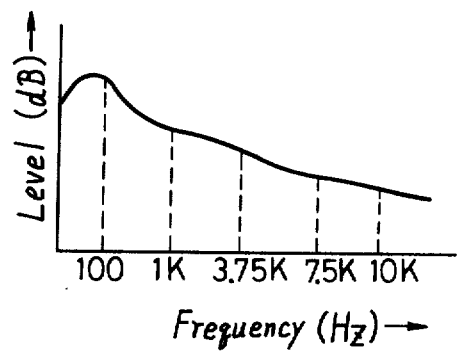
FIG. 4 is a perspective view of a second embodiment of a brake pad.
Figure 5:
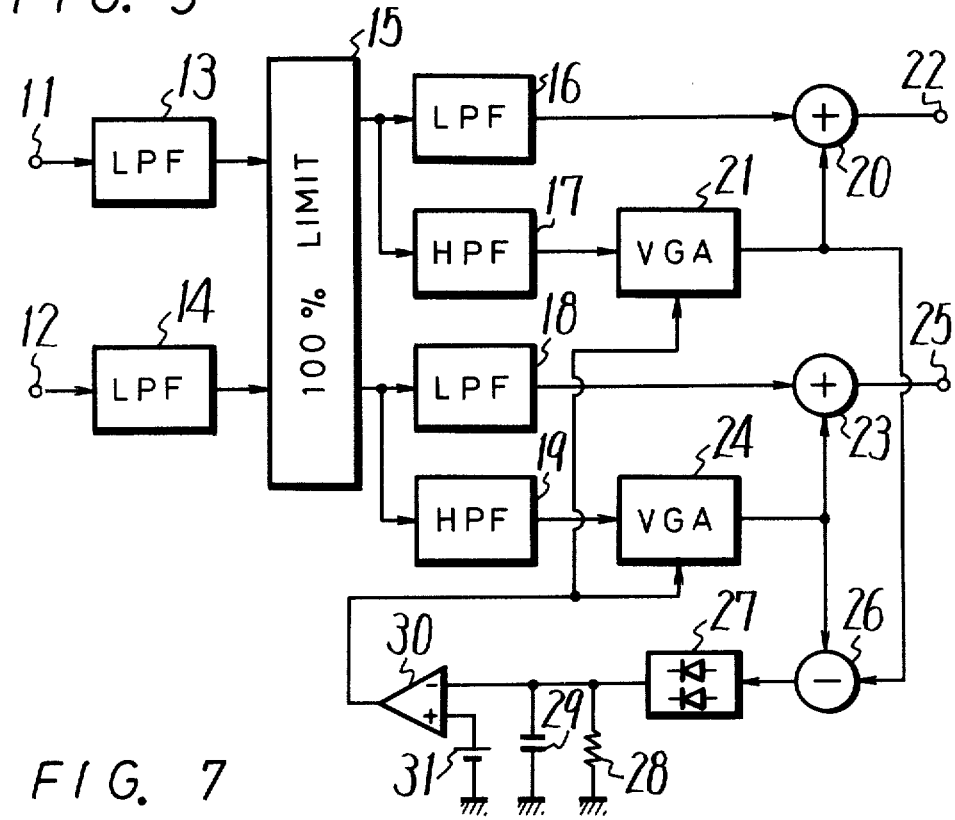
FIG. 5 is a plan view of the brake pad shown in FIG. 4.

FIGS. 4 and 5 disclose a second embodiment of brake pad 38 than can be substituted for brake pad 18. In this embodiment, the backing plate 37 is bonded to brake lining 39 which incorporates a frictional braking section 40 that defines a braking surface 41 defined in a braking plane 42. The brake lining 39 has an integral chamfered section 43 and a front shoulder 44 at the rear end of the chamfered section 43 and front edge 45 of section 40. A graphite insert 46 is bonded to the chamfered section 43 and abuts the shoulder 44. The insert 46 extends the full width of the lining 39. The insert 46 is inclined on chamfered section 43 such that its upper surface 47 is tapered forwardly and away from plane 42.

Similarly, as with the first embodiment, a leading contact edge 45 of the braking surface 41 is adjacent the graphite insert 46. When the brakes are actuated and the pad 38 comes in contact with the rotor, section 33 of the rotor contacts the graphite immediately before engaging leading contact edge 45. The rotor surface section 33 then passes under the remainder of braking surface 41. As with the first embodiment, the graphite lubricates the rotor section immediately before contact of the rotor section with the leading contact edge 45. Furthermore, the second embodiment takes into account considerable wear of the lining 39. If the lining 39 becomes thin and its braking surface becomes defined in a braking plane 42a as shown in phantom, the new leading contact edge 45a as shown in phantom is moved forward. However, this new leading contact edge 45a remains immediately behind the graphite insert 46 such that the graphite insert 46 still lubricates the rotor immediately before the new leading contact edge 45a of the braking section 40 engages the rotor section. In addition, the surface of insert 46 which abuts the rotor attains a maximum dimension after the insert is worn down to the bottom point 49 of shoulder 44. The maximum dimension of the abutting surface of insert 46 prevents excessive lubrication of the rotor.

Figure 6:
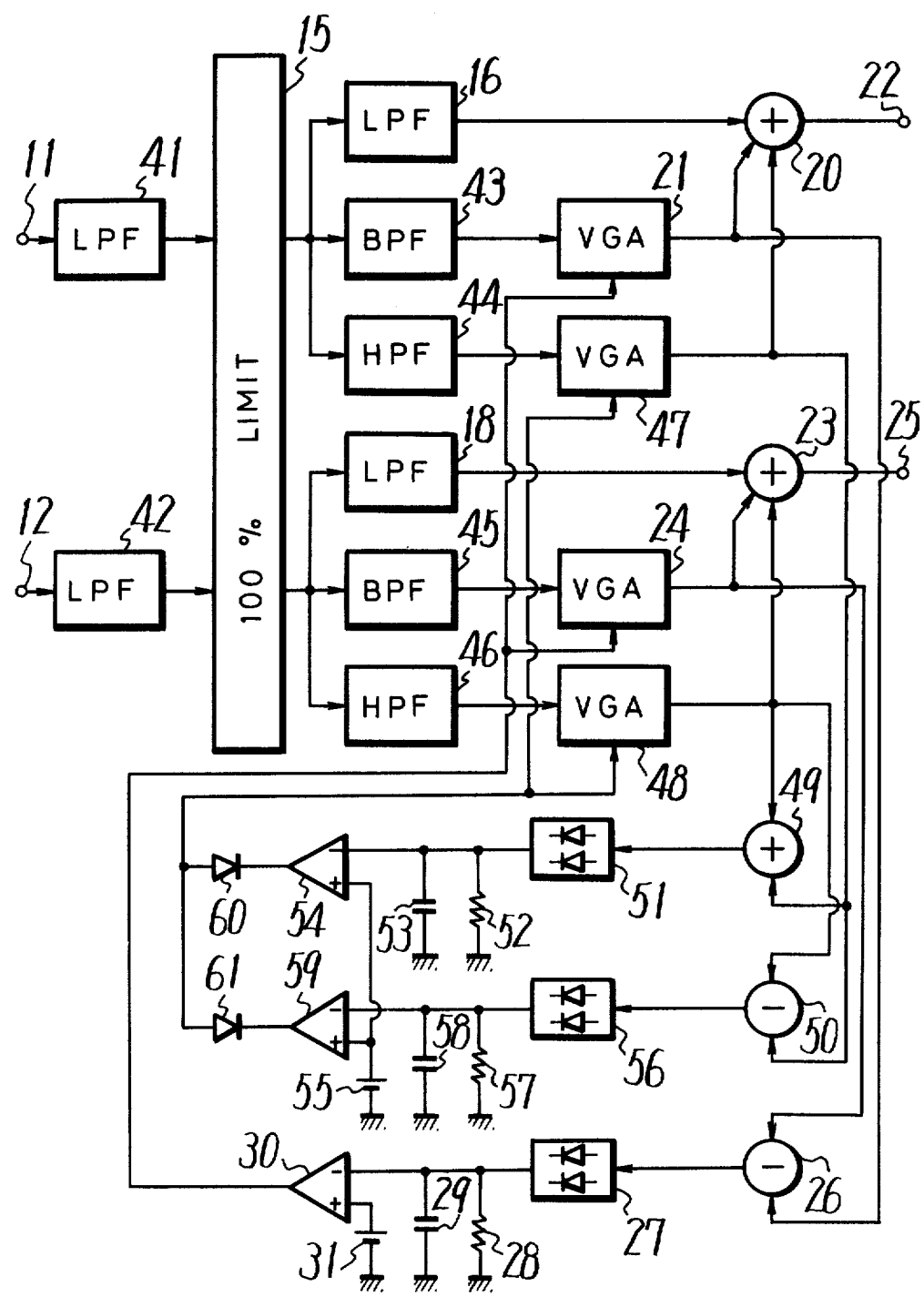
FIG. 6 is a perspective view of a third embodiment of a brake pad.

FIG. 6 discloses another brake pad 58 which incorporates a backing plate 59 and a lining 60 which eliminates the need for a distinct graphite insert. Lining 60 has graphite particles distributed or interspersed throughout the material. However, the one-piece lining 60 is divided into a lead portion 62 and a remaining portion 64. The graphite material is more densely distributed throughout the lead portion 62 than it is throughout the remaining portion 64. The concentration of graphite particulates is increased 50% to 100% over conventional graphite embeded linings. In other words, the concentration of graphite particulates in the leading portion 62 can have a concentration from 10% to 20%. The leading portion 62 has a length of approximately one-third the total length of lining 60. It is believed, however, the lead portion 62 can extend from approximately one-fourth to one-half the length of the brake lining without any significant changes in the effect of the noise reducing and braking properties of the brake pad.

The remining portion 64 is made with a less concentration of graphite material and, hence, has a higher co-efficient of friction than the leading portion 62. Differentiated from the first two embodiments, the leading contact edge 65 of the braking surface of lining 60 is coincidental with the lubricating portion 62 rather than placed immediately behind it because the lubricating lead portion 62 also produces a braking effect. The lubricating lead portion 62 is, in effect, a lubricating brake lining; i.e., it lubricates and contributes to the overall braking effort. However, as with the first two embodiments, the brake pad 58 has a section having a higher co-efficient of friction placed behind a section with a lower co-efficient of friction. Hence, the rotor 12, when rotated, has section 33 first lubricated by the leading section 62 and then passed through the remaining section 64 of higher co-efficient of friction.

Figure 7:
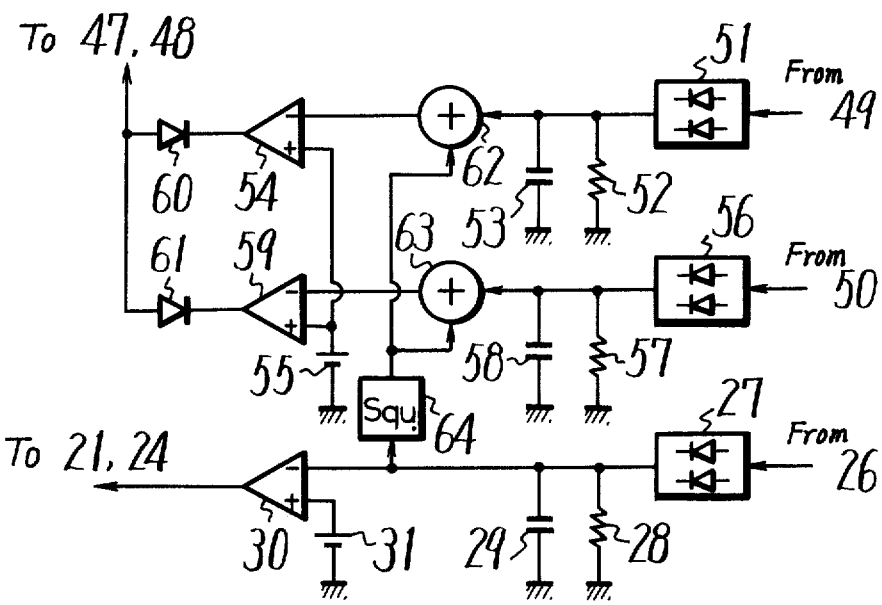
FIG. 7 is a perspective view of a fourth embodiment of a brake pad.

FIG. 7 discloses another brake pad 68 having a backing plate 70 that has a lining 72 bonded thereto. A graphite block 74 is spaced forwardly from the leading edge 76 of the frictional lining 72 and bonded to the backing plate 70. The block 74 extends the full width of lining 72. The rotor 12, when rotating and when the brakes are actuacted, has its surface section 33 engage block 74. Further rotation of rotor 12 a small arcuate amount causes the then lubricated section 33 to contact the leading edge 76 of the brake lining 72.

It has been found that all of the above embodiments have the advantages of placing lubricant on the rotor just before or simultaneously as the rotor comes into contact with the leading edge of the friction lining. Because it has been determined that the leading edge of the brake lining is the major cause of brake noise, it is important to place the lubricant on the rotor such that the full effect of the lubricant is felt by the leading edge of the brake pad.

The preferred embodiments have great advantages over other brake pads that have lubricant discs embeded within the midsection of the lining. The midsection of the lining of the conventional brake pads wipes off most of the lubricant from the rotor section before the rotor section rotates around to contact the leading edge of the friction lining. In addition, by having the lubricant applied in the proximity of the leading edge of the lining, the rotor does not disperse the lubricant even though the rotor may be rapidly rotating. The rotor section 33 speeds to rotate only a small amount, if at all, before contacting the leading edge of the brake lining.

Even though positioning the lubricant at a rear edge of the brake pad is better than at a midsection of the brake pad, the leading position is preferred. If the lubricating section was applied at the rear section of the brake pad, a substantial portion of the lubricant would be dispersed off of the rotor due to the rapid rotation of the rotor before the lubricated rotor section engages the leading edge of the brake lining.

In this fashion, a disc brake assembly is constructed that most advantageously lubricates a rotor section before or simultaneously as the rotor section abuts a leading edge of the brake lining.

Variations and modifications of the present invention are possible without departing from its scope and spirit as defined by the appended claims.

INDUSTRIAL APPLICABILITY

This invention has industrial applicability to motor vehicles and provides an effective and quiet brake.

The embodiments of the invention in which an exclusive property of privilege is claimed are defined as follows:

1. A brake pad for frictional engagement to a rotatable member, said brake pad characterized by:
   means for lubricating said rotatable member;
   means for frictionally engaging said rotatable member having a higher coefficient of friction than said lubricating means;
   said lubricating means comprising a solid lubricant positioned such that said lubricating means lubricates a section of said rotatable member and said section then contacting a leading edge of said frictionally engaging means before contacting any other portion of said frictional engaging means.

2. A brake pad for frictional engagement to a rotatable member, said brake pad characterized by:
   a leading edge of said pad comprising a solid lubricating material adapted to lubricate said rotatable member upon engagement of said brake pad to said rotating member; and
   a trailing portion of said brake pad having a higher frictional coefficient than said lubricating material for frictionally engaging a section of said rotatable member after said rotatable member section is lubricated by said lubricating material.

3. A disc brake pad having a surface defining a braking plane of said pad, said pad characterized by:
   a fricional lining having a surface in a braking plane;
   a chamfered leading section tapered forwardly and away from the braking plane of said pad; and
   a solid lubricant bonded to said tapered section such that said solid lubricant has a surface in said braking plane immediately forward of a leading contact edge of said frictional lining in the braking plane.

4. A brake pad characterized by:
   a lubricant homogeneously mixed in a leading portion of said pad; and
   the concentration of said lubricant in said leading portion of said pad being greater than in the remaining portion of said pad.

5. A brake pad as defined in claim 4 wherein said leading portion extending approximately one-third the length of the full brake pad.

6. A brake pad as defined in claim 4 wherein;
   said leading portion extending approximately one-fourth to one-half the length of said brake pad.

7. A brake pad as defined in claim 4 wherein;
   the concentration of said lubricant in said leading portion is 50% to 100% greater than in said remaining portion.

8. A brake pad as defined in claim 4 wherein;
   said lubricant comprising solid particles of graphite; and
   said concentration of lubricant in said leading portion ranging from 10% to 20%.

9. A brake pad characterized by:
   a one-piece lining having a leading portion and remaining portion;
   said leading portion of said one-piece lining having graphite particles distributed throughout; and
   said graphite particles being more densely distributed throughout said leading portion than throughout said remaining portion.

10. A brake assembly including a rotatable member, a pair of brake pads having frictional engaging linings, and an actuator to engage said linings of said pads to said rotatable member, said brake assembly characterized by:
    means for lubricating said rotor; and
    said lubricating means positioned such that said lubricating means lubricates a section of said rotatable member, said section adapted to contact a leading edge of said fricional engaging linings before being any other portion of said linings.

* * * * *